May 25, 1965  J. G. CAERO  3,185,257
SERVO-TYPE SPREADING DISC BRAKE
Filed July 30, 1962  4 Sheets-Sheet 1

INVENTOR.
JOSE G. CAERO
BY
Eugene C. Knoblock
ATTORNEY

May 25, 1965 J. G. CAERO 3,185,257
SERVO-TYPE SPREADING DISC BRAKE
Filed July 30, 1962 4 Sheets-Sheet 2

INVENTOR.
JOSE G. CAERO
BY
*Eugene C. Knoblock*
ATTORNEY

May 25, 1965  J. G. CAERO  3,185,257
SERVO-TYPE SPREADING DISC BRAKE
Filed July 30, 1962  4 Sheets-Sheet 3

INVENTOR.
JOSE G. CAERO
BY
ATTORNEY

May 25, 1965  J. G. CAERO  3,185,257
SERVO-TYPE SPREADING DISC BRAKE
Filed July 30, 1962  4 Sheets-Sheet 4

INVENTOR.
JOSE G. CAERO
BY
Eugene C. Knoblock
ATTORNEY

United States Patent Office 3,185,257
Patented May 25, 1965

3,185,257
SERVO-TYPE SPREADING DISC BRAKE
Jose G. Caero, 1124 W. Montecito Way,
San Diego, Calif.
Filed July 30, 1962, Ser. No. 213,318
10 Claims. (Cl. 188—72)

This invention relates to improvements in disk brakes, and more particularly to vehicle brakes of the self-energizing type.

The primary object of this invention is to provide a vehicle disk brake which is self-energizing in both forward and reverse vehicle operation, which is efficient and which has good heat dissipating characteristics.

A further object is to provide a disk brake of this character having a novel actuating means.

A further object is to provide a disk brake of this character which is inexpensive to manufacture and easy to assemble and install.

A further object is to provide a disk brake which is self-adjusting.

A further object is to provide a disk brake of this character wherein braking torque will be taken up by a friction disk and transferred to multiple reaction points so as to minimize the pitching or pitch back produced when brake torque is taken at only one point.

A further object is to provide a disk brake wherein a rotatable part may be provided with internal passages to circulate coolant for heat dissipation.

A further object is to provide a brake of this character wherein opposed brake disks bearing frictional material at their outer faces are forced into frictional braking engagement with opposed surfaces of a rotatable brake drum upon relative rotation thereof, and wherein one of said opposed members has two segments adapted for relative axial movement whereby actuation of brake-applying means urges one segment against the rotating brake drum to rotate the other segment and initiate self-energizing operation of the opposed brake disks.

Other objects will be apparent from the following specification.

Figure 1:
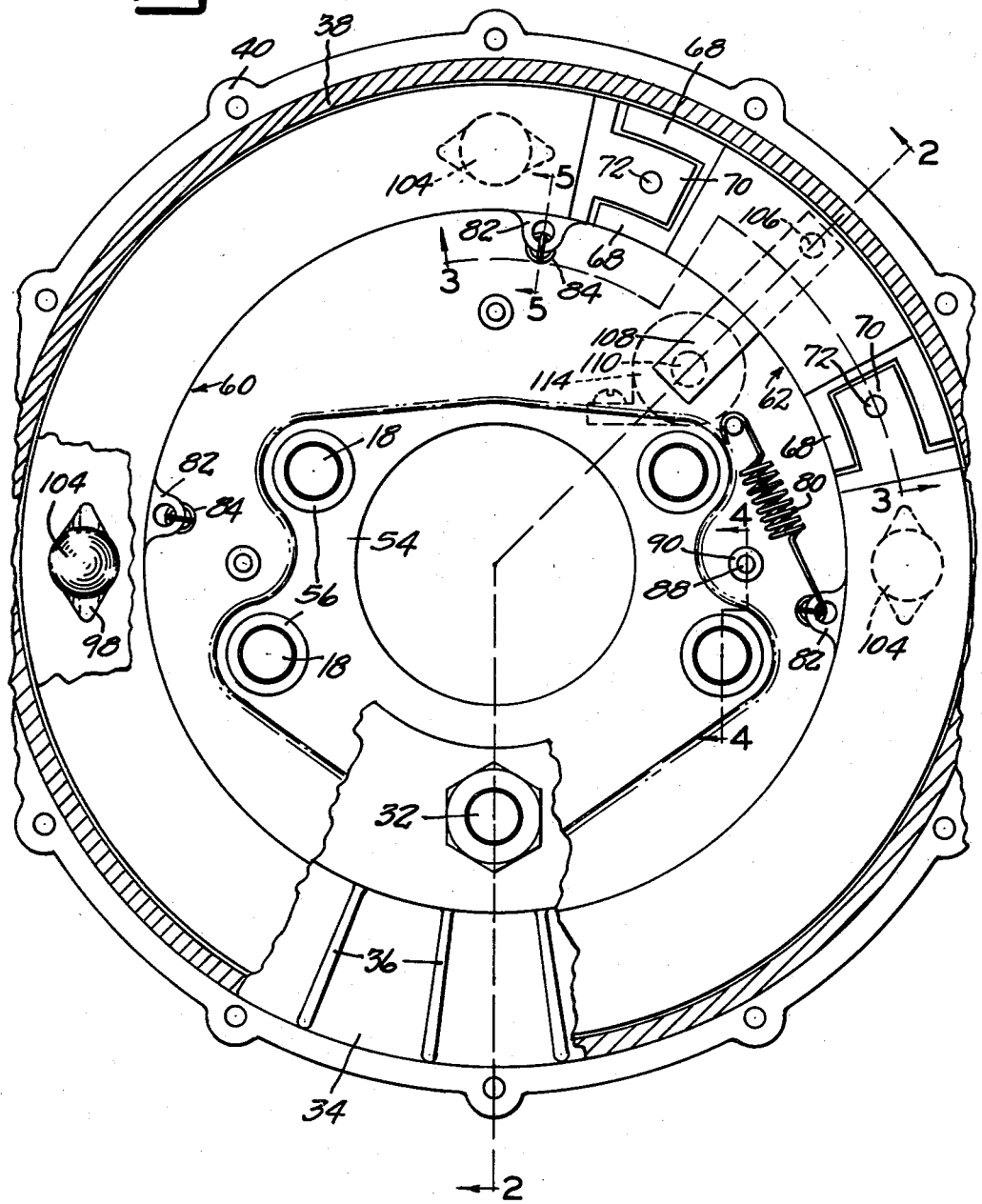
FIG. 1 is a sectional view of a brake, taken on line 1—1 of FIG. 2 and showing parts broken away.

The drawings illustrate preferred embodiments of the invention as applied to a brake on a front or steering wheel of a vehicle, but it will be understood that the brake may be applied with equal facility to the rear or non-steering wheels of a vehicle, as well understood in the art. The numeral 10 designates a wheel spindle mounted upon a spindle carrier 12 of a conventional character mounted pivotally upon the front axle (not shown) of a motor vehicle. A wheel hub 14 or mounting flange is journaled upon the spindle by means of a bearing 16 and is detachably mounted on the spindle by a conventional retainer (not shown).

The spindle carrier 12 has fixedly secured thereto a plurality of spaced pins 18 arranged in parallel relation to each other and to the axle of the spindle 10. The pins 18 are preferably shouldered at 20, and the shoulders 20 overlie and serve to retain a backing plate 22 serving as a dust shield and preferably terminating in a cylindrical flange 24.

Figure 2:
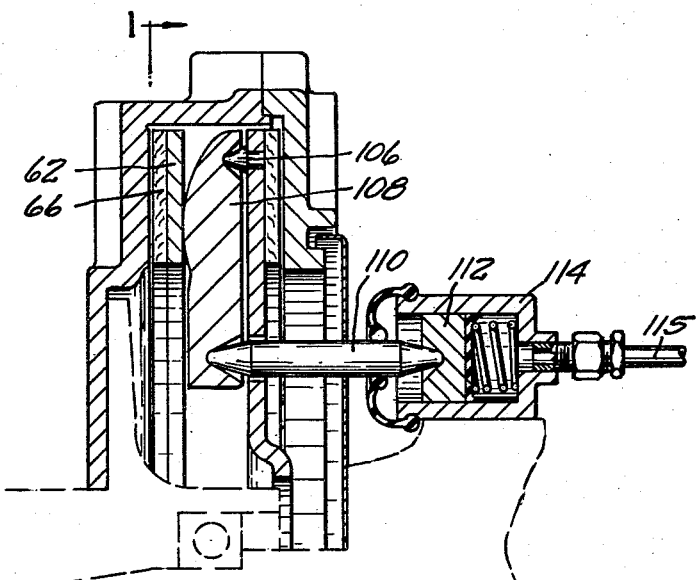
FIG. 2 is an axial sectional view of the brake taken on line 2—2 of FIG. 1.
Figure 2:
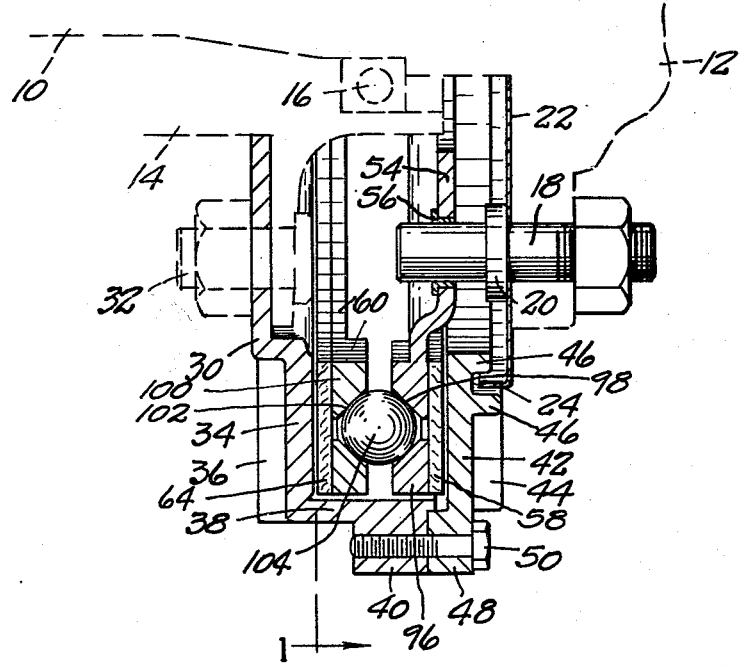
Figure 3:
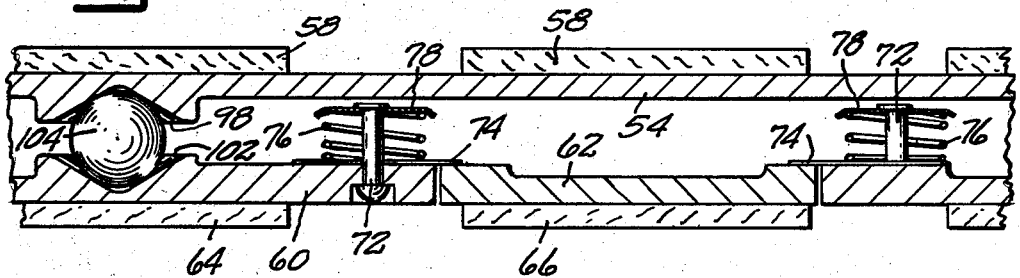
FIG. 3 is a fragmentary sectional view taken on line 3—3 of FIG. 1.

The outboard part 30 of a brake drum is secured to the wheel hub 14 by bolts or other securing members 32, said brake drum part 30 including an inwardly offset annular friction surface 34 from which ribs or fins 36, preferably extending axially as seen in FIG. 2, project and serve as cooling fins. At its outer margin the outboard brake drum part 30 has a cylindrical flange 38 provided with circumferentially spaced projections or lugs 40. An inboard brake drum part 42 defines a frictional surface spaced from and opposite the friction surface 34 of the outboard part, said inner surfaces preferably being substantially parallel. Part 42 may be ribbed or finned at 44. Adjacent the inner margin the inboard part 42 may have spaced circumferential flanges 46 to define a groove receiving with rotative clearance the cylindrical flange 24 of the backing plate 22. Circumferentially spaced lugs or projections 48 are formed at the outer margin of the inboard part 42 in register with the lugs or projections 40, and the lugs 40 and 48 are apertured, and one thereof is screw-threaded so as to receive cap screws 50 for fixedly interconnecting the inboard and outboard parts of the brake drum.

An inboard plate disk 54 is mounted within the brake drum for axial movement but is retained or retarded against circumferential movement. Thus the disk 54 has a plurality of apertures therein through which the pins 18 project, said apertures preferably mounting bearing sleeves 56 snugly and slidably mounted upon the pins 18. The disk 54 has a central aperture providing clearance with the wheel hub 14 and its outer diameter is slightly less than the inner diameter of the cylindrical flange 38 of the brake drum. The outer margin of the disk 54 carries brake lining 58 which may constitute one annular part or a plurality of segments and which is adapted for frictional braking engagement with the inboard brake drum part 42. The friction surface part 34 of the brake drum is confronted by a sectional annular assembly. This assembly includes at least one outboard brake disk segment 60 of C-shape and preferably in excess of 270 degrees circumferentially and at least one brake actuator segment 62. The brake disk segment 60 carries brake lining 64 and the brake actuator segment 62 carries brake lining 66. The ends of the segments 60 and 62 preferably interfit to accommodate limited relative axial movement thereof, and for this purpose the ends of the segment 62 are preferably recessed to define inner and outer circumferentially projecting fingers 68, and the ends of the segment 60 are reduced to provied a tongue portion 70 projecting between the fingers 68 with clearance. Means are provided to normally hold the segments 60 and 62 in coplanar relation. As here shown, such means include a pin 72 carried by the tongue 70 and passing through a washer 74 of a diameter greater than the width of the tongue 70 so as to engage at its margin portions of the actuator segment 62 and its fingers 68. A coil spring 76 encircles a portion of the pin 72 which projects toward the brake disk 54, and this coil spring bears upon a second washer 78 carried by the inner end of the pin 72 clear of the brake disk 54. It will be apparent that this arrangement normally holds the parts 60 and 62 in coplanar relation but the coil spring 76 may flex to accommodate lateral movement of part 62 away from coplanar relation.

Figure 5:
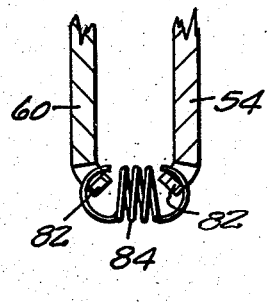
FIG. 5 is a fragmentary detail sectional view taken on line 5—5 of FIG. 1.

A coil spring, such as a tension spring 80, is attached to the outboard brake disk segment 60 at one of its ends and at its opposite end is attached to a non-rotatable member, such as the inboard disk 54. The inboard disk 54 and the outboard disk segment 60 are also interconnected at a plurality of circumferentially spaced points, as at lugs or ears 82 projecting from the inner circumference of segment 60 and struck from the disk 54, by means of tension coil springs 84, as best seen in FIG. 5. The coil springs 84 serve normally to floatingly connect disk 60 to disk 54 in register and at minimum and inoperative spaced relation. The springs 76 and associated parts serve to floatingly connect actuator segment 62 to the disk segment 60.

Figure 4:
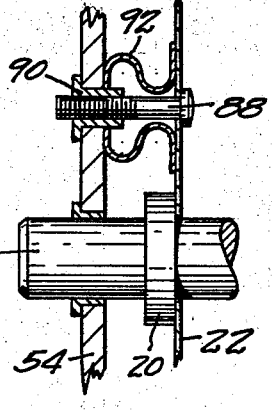
FIG. 4 is a fragmentary detail sectional view taken on line 4—4 of FIG. 1.

The inboard brake disk 54 is spring urged to normally provide a predetermined clearance between its brake lining 58 and the brake drum part 42. One construction of such positioning spring is illustrated in FIG. 4. In this construction a plurality of pins 88 at circumferentially spaced points project outwardly from disk 54. Pins 88 may be mounted by means of internally screw-threaded sleeves 90 slidably mounted in apertures in the disk 54. The pins 88 are screw-threaded in the sleeves and are preferably of a length to project through the dust guard 22. A spring 92, such as a leaf spring, as shown in FIG. 4, anchored at its center by the sleeve 90 and bearing at its ends upon the dust plate 22 serves to normally urge the inboard brake disk away from the inboard part 42 of the brake drum to provide running clearance of the brake lining 58 with the inboard brake drum part 42.

Each of the inboard disk 54 and the outboard brake disk segment 60 has a plurality of circumferentially spaced camming recesses associated therewith, said camming recesses of said respective parts being normally arranged in confronting or substantially registering relation. Preferably the camming disks are formed in inserts carried by the respective brake disks. Thus inboard brake disk 54 may be provided with circumferentially spaced openings, in each of which is mounted an insert 96 formed of a metal of any suitable character. A recess 98 is formed in the inner face of the insert 96 centrally thereof and preferably being circumferentially elongated. Inserts 100 may be mounted in openings in the outboard brake disk segment and each is preferably provided with a recess 102 at its inner face of substantially the same character as the recess 98, that is, preferably circumferentially elongated. A roller 104, preferably of spherical character, is interposed between the inserts 96 and 100 seating in the recesses 98 and 102 in firm frictional engagement therewith, as provided by the tension exerted by the springs 84. Springs 84 are preferably positioned adjacent the respective rollers and recesses.

The brake is operated by any means found suitable for the purpose of pressing the friction material or brake lining 66 of the actuator segment 62 against the brake drum. One actuating means, cited as illustrative, is illustrated in FIG. 2 and entails the pivotal mounting at a pivot pin 106 on the inboard disk 54 of a pivot lever 108 having a surface engaging the back or inner surface of the actuator segment 62. An actuator pin 110 may be slidable in an opening in the dust plate 22, with one end thereof connected to the lever 108 and its opposite end connected to a piston 112 of a fluid pressure cylinder 114 suitably carried by the brake mounting structure, as upon the carrier 12. In the form shown, the pin 110 has tapered ends which are seated in recesses in the parts 108 and 112, but it will be understood that pivotal connection between the parts may be provided in any suitable manner. Likewise, it will be understood that a fluid pressure line 115 from a master cylinder (not shown) to the cylinder 114 may provide the fluid pressure necessary to actuate the piston 112. Alternatively, other means well understood in the art, such as cable operated means (not shown) may be provided for pivoting the lever 108.

In operation, the lever 108 will normally assume a position determined by springs 84 and 92 and permitting the retraction of the brake disk 54, brake segment 60, and the actuator segment 62 from the brake drum. When brake-applying force is exerted to pivot the lever 108 in a clockwise direction as illustrated in FIG. 2, the actuator segment 62 is urged axially toward the drum part 34. During this time the connection by springs 84 between the disk 54 and the disk segment 60 and the guide action of pins 18 on disk 54 will tend to hold the disk part 54 clear of the brake drum portion 42. As soon as the lining part 66 of the actuator segment 62 contacts the drum surface 34 while the brake drum is rotating, a rotative or circumferential movement of the actuator segment 62 will occur depending upon the direction of rotation of the drum. This rotative movement of segment 62 is transmitted to the adjacent brake disk segment 60 to push the latter circumferentially. It will be noted that the axial movement of the actuator segment 62 relative to the brake segment 60 toward the brake drum will be accommodated by the coil springs 76.

As circumferential movement of the brake disk segment 60 occurs, the recesses 102 of the brake disk segment 60 which receive the ball rollers 104 move out of register with the recesses 98 of the inboard disk 54. The circumferential disalignment of these camming recesses introduces a camming force through the medium of the spherical rollers 104 which tends to separate the braking members 54 and 60 and urges their respective brake linings 58 and 64 into braking engagement with the parts 42 and 34, respectively, of the brake drum to produce a self-energizing braking action. Inasmuch as disk 54 is held against rotation, relative rotation of the segment 60 with respect to disk 54 progressively increases the tendency of the braking member to separate and to apply frictional braking force upon the brake drum.

When the brake applying force exerted upon the lever 108 to apply the brakes ceases, the actuator segment 62 moves out of engagement with the brake drum through the medium of the springs 76 and 84. The combined force of the springs 80 and 84 is sufficient to return the brake disk segment 60 to a circumferential position at which the recesses 102 register with recesses 98 of the inboard brake disk 54 by a combined axial and circumferential movement. At the same time springs 84 and 92 act on the brake disk 54 to return it axially to normal inoperative position. Thus the braking members resume positions with sufficient clearance for running of the vehicle wheels without retarding influence from the brake elements.

It will be observed that the total rotational force required for braking action is taken up or reacted by the pins 18 regardless of the direction of rotation. It will be understood, of course, that the pins 18 are illustrative only of a rotation retarding connection of the inboard disk 54 and carrier 12, and that any other connection between the spindle carrier and the inboard disk 54 which will permit axial movement of that disk without rotation thereof may be employed to take up rotational braking force.

The ramp angle of the recesses 98 and 102 in a circumferential direction is important to determine the amount of relative rotation which must occur between the circumferentially shiftable brake disk segment 60 and the opposed brake disk 54 to set the brake. This angle will preferably be so calculated as to effect the desired operation of the brake without producing such wedging of the rollers at the camming recesses as would retard releasing of the brake members from braking action when brake-applying force upon the actuator segment 62 is released.

Figure 6:
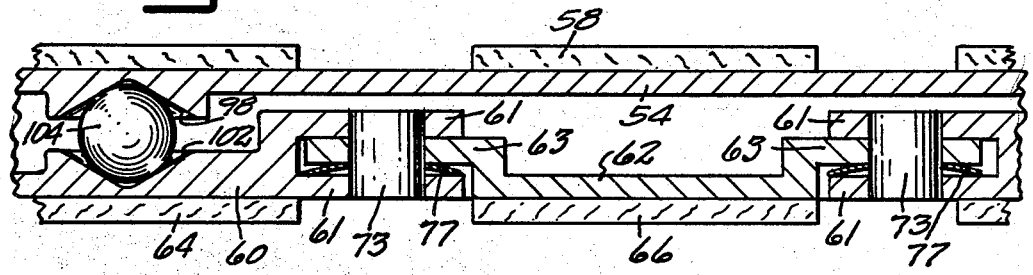
FIG. 6 is a fragmentary detail sectional view illustrating a modified embodiment of the invention as an alternate for FIG. 3.

FIG. 6 illustrates an optional method of attaching or interconnecting the actuator segment 62 to the outboard disk segment 60. In this instance the ends of the brake disk segment 60 are bifurcated at 61 to receive the offset end 63 of the actuator segment 62 with clearance sufficient to accommodate a spring disk 77 between parts 61 and 63. The parts 61 and 63 are interconnected by a pin 73 preferably having a slide fit in one of said interconnected parts so as to accommodate limited relative axial movement of the segments 60 and 62. This construction functions substantially the same as previously described, with the springs 77 serving the same function as the spring 76 in the preferred form, namely, permitting axial movement of the actuator segment 62 relative to the brake segment 60 until such time as the friction member 66 of the segment 62 engages the brake drum and causes rotational or circumferential movement to both the actuator segment 62 and the brake disk segment 60, as previously described.

Figure 7:
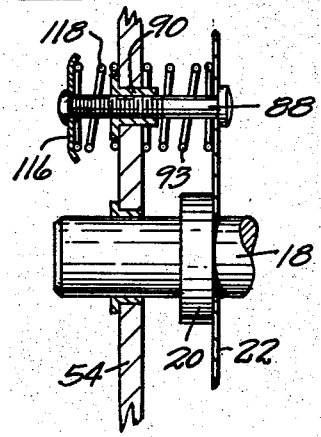
FIG. 7 is a fragmentary detail sectional view illustrating a modified embodiment of the invention as an alternate for FIG. 4.

The construction illustrated in FIG. 7 provides for automatic compensation for brake lining wear on the disk 54. In this construction threaded sleeves 90 have a slide fit in openings in the brake disk 54 and mount pins 88, as previously described, with a spring 93 interposed between the brake disk 54 and the dust shield 22, said spring preferably being a coil spring and made of a material capable of taking a permanent set when it is deflected by disk 54 in excess of the deflection thereof normally occurring to set the brakes when the friction material 58 on the brake disk is of initial or starting thickness. The pin 88 projects from the inner face of the brake shoe 54 and mounts at its inner end a washer 116 against which abuts the inner end of a coil spring 118 whose outer end bears against the brake disk 54. Spring 118 compensates for any permanent set taken by the coil spring 93 incident to movement of the disk 54 in the direction of the dust shield 22 to maintain a proper clearance between the surface of the worn brake shoe 58 and the braking surface 42 of the inner drum. In this connection it is important to form the springs 84 which interconnect the disk parts 54 and 60 of a material which will take a permanent set when the parts 54 and 60 are spread in excess of the spreading thereof required to set the brakes before wear of the brake shoes 58 and 64 occurred. The slack incident to the compensating action resulting from the set taken by the springs 84 and 93, as explained above, is compensated by the coil spring 80 which imparts a slight rotative thrust upon the brake disk 60 as determined by the amount of permanent set taken by the springs and by the angle of the camming recesses and sufficient to cause circumferential disalignment of the recesses 98 and 102 which will cause the spherical rollers 104 to be held snugly and without free play in the camming recesses even though the camming recesses and their respective braking disks 54 and 60 are separated a greater distance than initially occurred when the brake was new and before wear upon the brake shoes occurred.

It will be apparent that the fins of the parts 34 and 42 of the brake drum at 36 and 44 provide good heat dissipating characteristics for the brake. Another important advantage of the construction is the simplicity of the device and the reduction of the number of parts involved therein which affects the cost of manufacture and assembly and, in particular, holds to a minimum such costs. It will also be apparent that the provision of a number of circumferentially spaced camming rollers 104 transfers the braking reaction to a number of points and thereby minimizes tendency of the brake disks 54 and 60 to tilt in a manner to detract from uniform brake application circumferentially of the brake drum.

Figure 8:
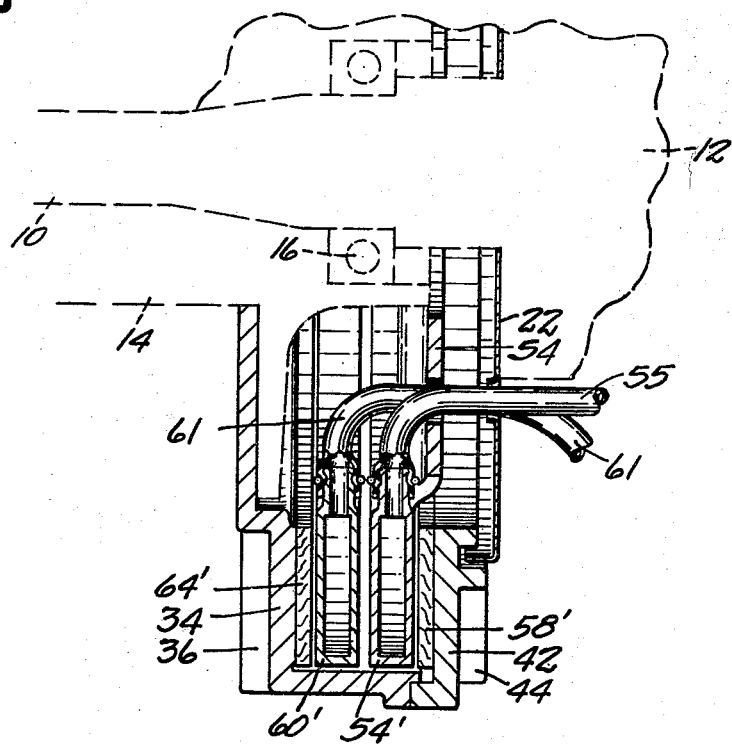
FIG. 8 is a fragmentary axial sectional view of a modified embodiment of the invention.

An alternate construction for cooling the brake is shown in FIG. 8. Here the brake linings 58' and 64' are mounted on the brake drum parts 42 and 34, respectively, which have external cooling fins 44 and 36, respectively, as previously described. The brake disks 54' and 60' are hollow and are connected by flexible conduits 55 and 61 to a forced circulation system (not shown) containing a coolant liquid. The construction provides ample internal space to accommodate the conduits 55 and 61, and said conduits can enter the brake trough openings in the dust shield and pass between the disk 54 and the wheel hub 14.

While the preferred embodiment of the invention has been described and illustrated, it will be understood that changes in the construction may be made within the scope of the appended claims without departing from the spirit of the invention.

I claim:
1. A disk brake comprising
a rotatable member to be braked,
a carrier for said rotatable member,
said rotatable member having spaced opposed friction surfaces,
first and second braking members between and normally clear of said surfaces,
said first braking member being shiftable axially and non-rotatively on said carrier to and from engagement with one friction surface,
said second braking member having a floating connection with said first braking member and shiftable axially and rotatively relative to said first braking member to and from engagement with the other friction surface,
an actuator member carried by said second braking member and shiftable relative thereto in an axial direction,
means interposed between said first and second braking members and responsive to relative rotation of said members for moving said members axially into engagement with said friction surfaces, and
means for axially shifting said actuator member against a friction surface and thereby rotates said second braking member relative to said first braking member.

2. A disk brake comprising
a rotatable member to be braked,
a carrier for said rotatable member,
said rotatable member having spaced opposed friction surfaces,
first and second braking members between and normally clear of said surfaces,
said first braking member being shiftable axially and non-rotatively on said carrier to and from engagement with one friction surface,
said second braking member having a floating connection with said first braking member and shiftable axially and rotatively relative to said first braking member to and from engagement with the other friction surface,
an actuator member carried by said second braking member and shiftable relative thereto in an axial direction,
means interposed between said first and second braking members and responsive to relative rotation of said members to shift said members axially into engagement with said friction surfaces,
said actuator member having a floating connection with said second braking member, and
means for axially shifting said actuator member into engagement with said rotatable member to effect rotation thereof and thereby effect rotation of said second braking member.

3. A disk brake comprising
a rotatable member to be braked,
a carrier for said rotatable member,
said rotatable member having spaced opposed friction surfaces,
first and second braking members between and normally clear of said surfaces,
said first braking member being shiftable axially and non-rotatively on said carrier to and from engagement with one friction surface,
said second braking member having a floating connection with said first braking member and shiftable axially and rotatively relative to said first braking member to and from engagement with the other friction surface, an actuator member carried by said second braking member and shiftable relative thereto in an axial direction, means interposed between said first and second braking members and responsive to relative rotation of said members to shift said members axially into engagement with said friction surfaces, means for axially shifting said actuator member against a rotating friction surface to be rotatively urged and thereby to rotate said second braking member relative to said first braking member, and spring means normally urging said braking members into inoperative position clear of said friction surfaces.

4. A disk brake comprising
a rotatable member to be braked,
a carrier for said rotatable member,
said rotatable member having spaced opposed friction surfaces,
first and second braking members between and normally clear of said surfaces,
said first braking member being shiftable axially and non-rotatively on said carrier to and from engagement with one friction surface,
said second braking member having a floating connection with said first braking member and shiftable axially and rotatively relative to said first braking member to and from engagement with the other friction surface,
an actuator member carried by said second braking member and shiftable relative thereto in an axial direction,
means interposed between said first and second braking members and responsive to relative rotation of said members to shift said members axially into engagement with said friction surfaces, and
means for axially shifting said actuator member against a rotating friction surface to rotate the same and thereby to rotate said second braking member relative to said first braking member,
said second braking member and said actuator member constituting loosely interconnected segments of an annular unit.

5. A disk brake comprising
a rotatable member to be braked,
a carrier for said rotatable member,
said rotatable member having spaced opposed friction surfaces,
first and second braking members between and normally clear of said surfaces,
said first braking member being shiftable axially and nonrotatively on said carrier to and from engagement with one friction surface,
said second braking member having a floating connection with said first braking member and shiftable axially and rotatively relative to said first braking member to and from engagement with the other friction surface,
an actuator member carried by said second braking member and shiftable relative thereto in an axial direction,
means interposed between said first and second braking members and responsive to relative rotation of said members to shift said members axially into engagement with said friction surfaces, and
means for axially shifting said actuator member against a rotating friction surface to be rotatively urged and thereby to rotate said second braking member relative to said first braking member,
said floating connection between said first and second breaking members.

6. A disk brake comprising
a rotatable member to be braked,
a carrier for said rotatable member,
said rotatable member having spaced opposed friction surfaces,
first and second braking members between and normally clear of said surfaces,
said first braking member being shiftable axially and non-rotatively on said carrier to and from engagement with one friction surface,
said second braking member having a floating connection with said first braking member and shiftable axially and rotatively relative to said first braking member to and from engagement with the other friction surface,
an actuator member carried by said second braking member and shiftable relative thereto in an axial direction,
means interposed between said first and second braking members and responsive to relative rotation of said members to shift said members axially into engagement with said friction surfaces, and
means for axially shifting said actuator member against a rotating friction surface to be rotatively displaced and thereby to rotate said second braking member relative to said first braking member,
said floating connection between said first and second braking members including spring means urging said members toward each other axially, and
spring means urging said second braking member to a predetermined rotative position relative to said first braking member.

7. A disk brake comprising
a rotatable member to be braked,
a carrier for said rotatable member,
said rotatable member having spaced opposed friction surfaces,
first and second braking members between and normally clear of said surfaces,
said first braking member being shiftable axially and non-rotatively on said carrier to and from engagement with one friction surface,
said second braking member having a floating connection with said first braking member and shiftable axially and rotatively relative to said first braking member to and from engagement with the other friction surface,
an actuator member carried by said second braking member and shiftable relative thereto in an axial relation,
means interposed between said first and second braking members and responsive to relative rotation of said members to shift said members axially into engagement with said friction surfaces, and
means for axially shifting said actuator member against a rotating friction surface to be rotatively displaced and thereby to rotate said second braking member relative to said first braking member,
said actuator member having a resilient connection with said second braking member accommodating relative axial movement thereof.

8. A disk brake comprising
a rotatable member to be braked,
a carrier for said rotatable member,
said rotatable member having spaced opposed friction surfaces,
first and second braking members between and normally clear of said surfaces,
said first braking member being shiftable axially and non-rotatively on said carrier to and from engagement with one friction surface,
said second braking member having a floating connection with said first braking member and shiftable axially and rotatively relative to said first braking member to and from engagement with the other friction surface,
an actuator member carried by said second braking member and shiftable relative thereto in an axial direction, said first and second braking members having confronting cam recesses at multiple spaced points thereof, rollers interposed between said first and second braking members and seated in said cam recesses, and means for axially shifting said actuating member against a rotating friction surface to be rotatively displaced and therby to rotate said second braking member.

9. A disk brake comprising a rotatable member to be braked, a carrier mounting said rotatable member, said rotatable member having spaced confronting friction surfaces, first and second braking members interposed between said friction surfaces, resilient means interconnecting said braking members and normally positioning them between and clear of said friction surfaces, means on said carrier mounting said first braking member for axial non-rotative movement said second braking member including a pair of relatively axially shiftable segments, means interposed between said first braking member and one segment of said second braking member and responsive to rotation of said segment for spreading the braking members into engagement with said friction surfaces, and means for urging the other segment axially into engagement with a rotative friction surface to be rotated and thereby to impart rotative movement to both of said segments.

10. A disk brake comprising a rotatable member to be braked, a carrier for said rotatable member, said rotatable member having spaced opposed friction surfaces, first and second braking members between and normally clear of said surfaces, said first braking member being shiftable axially and nonrotatively on said carrier to and from engagement with one friction surface, said second braking member having a floating connection with said first braking member and shiftable axially and rotatively relative to said first braking member to and from engagement with the other friction surface, an actuator member carried by said second braking member and shiftable axially relative thereto, means interposed between said first and second braking members and responsive to relative rotation of said members to shift said members axially into engagement with said friction surfaces, means for axially shifting said actuator member against a rotating friction surface to be rotatably shifted thereby to rotate said second braking member relative to said first braking member, and means to normally position said first and second braking members clear of said friction surfaces.

References Cited by the Examiner

UNITED STATES PATENTS

| 1,776,954 | 9/30 | Sanford | 188—78 X |
| 1,837,573 | 12/31 | Mox | 188—78 X |
| 2,256,725 | 9/41 | Pierce et al. | 188—72 |
| 2,973,837 | 3/61 | Wilson | 188—73 |
| 3,053,345 | 9/62 | Zindler | 188—72 |
| 3,062,347 | 11/62 | Hornbostel | 188—264 X |
| 3,081,842 | 3/63 | Zindler et al. | 188—72 |

FOREIGN PATENTS

| 204,909 | 8/59 | Austria. |
| 883,417 | 11/61 | Great Britain. |

ARTHUR L. LA POINT, *Primary Examiner.*

EUGENE G. BOTZ, *Examiner.*